United States Patent
Lohwasser et al.

(10) Patent No.: US 6,352,781 B1
(45) Date of Patent: Mar. 5, 2002

(54) COMPOSITE FILM AND PROCESS FOR ITS MANUFACTURE

(75) Inventors: Wolfgang Lohwasser, Gailingen; Manfred Gerber, Singen, both of (DE); Hans-Rudolf Nägeli, Neuhausen (CH); Otto Hummel, Singen (DE)

(73) Assignee: Alusuisse Technology & Management Ltd. (CH)

( * ) Notice: Subject to any disclaimer, the term of this patent is extended or adjusted under 35 U.S.C. 154(b) by 0 days.

(21) Appl. No.: 09/492,096

(22) Filed: Jan. 27, 2000

(30) Foreign Application Priority Data

Feb. 17, 1999 (EP) ............................................. 99810141
Nov. 24, 1999 (EP) ............................................. 99811081

(51) Int. Cl.⁷ ........................... B32B 15/08; B32B 9/04; B05D 3/00
(52) U.S. Cl. .................. 428/450; 428/446; 427/255.7; 427/296
(58) Field of Search ................................ 428/446, 447, 428/448, 449, 450; 427/397.7

(56) References Cited

U.S. PATENT DOCUMENTS

| | | | |
|---|---|---|---|
| 4,568,413 A | | 2/1986 | Toth et al. |
| 4,702,963 A | * | 10/1987 | Phillips et al. .............. 428/426 |
| 5,085,904 A | * | 2/1992 | Deak et al. ................. 428/35.7 |
| 5,670,224 A | | 9/1997 | Izu et al. |
| 5,830,545 A | | 11/1998 | Frisk |
| 6,187,696 B1 | * | 2/2001 | Lim et al. ..................... 442/77 |

FOREIGN PATENT DOCUMENTS

EP 0484275 5/1992

OTHER PUBLICATIONS

Database WPI, Section Ch, Week 8920, Derwent Publications Ltd., London, GB; AN89–147742, XP002106448 & JP 01 090793 A, dated Apr. 7, 1989.
Database WPI, Section Ch, Week 8915, Derwent Publications Ltd., London, GB; AN , 89–111649, XP002106449 & JP 01 059625A, dated Mar. 7, 1989.
Database WPI, Section Ch, Week 9006, Derwent Publications Ltd., London, GB; AN 90–042124, XP002106450 & JP 01 320620A, dated Dec. 26, 1989.

* cited by examiner

Primary Examiner—Robert Dawson
Assistant Examiner—Michael J Feely
(74) Attorney, Agent, or Firm—Bachman & LaPointe, P.C.

(57) ABSTRACT

A composite plastic film comprises a plastic film which is coated, as desired at least on one side, with ceramic material deposited using a vacuum thin layer deposition process and a plastic layer deposited by extrusion coating on the plastic film or on the ceramic layer which may be present, such that the ceramic layer is situated between the plastic film and the plastic layer deposited by extrusion coating. In order to improve the strength of bonding, a metal layer of chromium, aluminum, nickel, titanium, iron, molybdenum or an alloy made up from at least two of these metals is provided, as an aid to bonding, between the plastic film or on the ceramic layer which may be present and the plastic layer deposited by extrusion coating. A thin metal layer deposited in such an amount that it has a thickness of approximately 0.1 to 0.5 nm corresponding to a monatomic coverage is sufficient for this purpose.

16 Claims, 1 Drawing Sheet

COMPOSITE FILM AND PROCESS FOR ITS MANUFACTURE

BACKGROUND OF THE INVENTION

The present invention relates to a composite plastic film comprising a plastic film, which is, if desired, at least on one side coated with ceramic material deposited using a vacuum thin layer deposition process, and a plastic layer deposited by extrusion coating on the plastic film or on the ceramic layer which may be present, such that the ceramic layer is situated between the plastic film and the plastic layer deposited by extrusion coating. Also within the scope of the invention is a process for manufacturing a composite film.

In composite plastic films comprising a substrate film and a plastic layer deposited by extrusion coating or laminate bonding the degree of bonding between the extruded layer and the substrate film is inadequate for many applications.

In order to improve the bonding between the substrate film and a plastic layer deposited by extrusion coating, it is known to employ modified copolymers and terpolymers of ethylene or propylene which often bond well.

The strength of the sealing seam is of decisive importance if a composite plastic film is to be used e.g. as a sealable film for packaging applications.

SUMMARY OF THE INVENTION

The object of the present invention is therefore to provide a composite plastic film of the kind described above in which the bond strength between the plastic layer deposited by extrusion coating and the substrate film is higher than in state of the art composite plastic films. A further objective of the invention is the provision of a suitable process for manufacturing such a composite plastic film.

That objective is achieved by way of the invention in which a metal layer of chromium, aluminum, nickel, titanium iron, molybdenum or an alloy made from at least two of these metals is provided as an aid to bonding between the plastic film, or ceramic layer which may be present, and the plastic layer deposited by extrusion coating. Preferred metals are chromium and aluminum, chromium being specially preferred. A preferred alloy is V2A steel.

BRIEF DESCRIPTION OF THE DRAWINGS

Further advantages, features and details of the invention are revealed by way of the following examples, the description and the drawings which show schematically in FIG. 1—layered structure of a composite plastic film according to the invention.

DETAILED DESCRIPTION OF PREFERRED EMBODIMENTS

Figure 1:
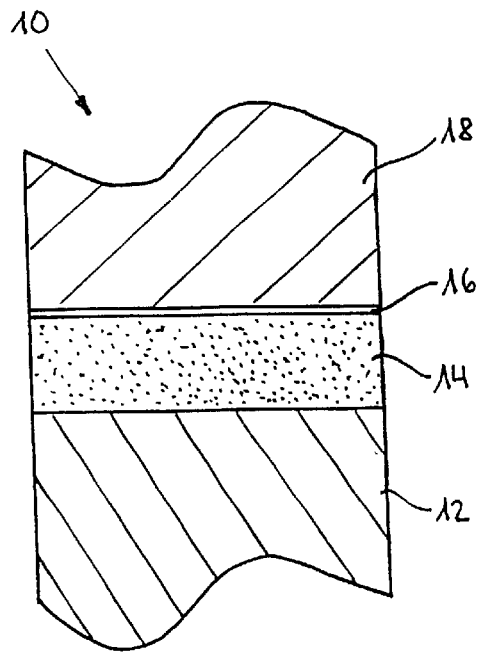

It has been found, surprisingly, that even a monatomic layer of metal is sufficient for good bonding. Monatomic does not mean here that the atoms have to be arranged in a monatomic manner; instead a as in all condensation processes, clusters of atoms are created. By a monatomic layer here is meant a surface coverage which would approximately lead to a monatomic layer if the atoms were distributed uniformly over the surface of the substrate.

Although thicker metal layers may be employed, for reasons of cost and insuring a high degree of transparency, a layer thickness of 0.1 to 0.5 nm, corresponding to a monatomic layer, is preferred. Also surprising is that even at a layer thickness of 0.2 nm the same bond strength is obtained as with thicker layers of 1 nm and greater. The 0.2 nm thick layers have almost no negative effect on the optical transparency of the finished composite film i.e. they are invisible to the human eye.

In order to achieve a good barrier against water vapor and gases in a composite plastic film according to the invention intended e.g. for packaging purposes, the plastic film may be coated with a ceramic layer of $SiO_x$ where x represents a number between 0.9 and 2, preferably a number between 1.5 and 1.8. This ceramic layer, situated between the plastic film and the metal layer, has no influence whatever on the elevated bond strength due to the metal layer.

In a preferred form of the composite plastic film the plastic layer deposited by extrusion coating comprises at least one of the plastics polyethylene (PE) or often well-bonding modified copolymers and terpolymers with ethylene (E) or propylene (P) as one of the monomer components, in particular E.AA, E.MAA, E.VA, E.MA, E.EA. E.nBA, E.CO, E.VA.CO, E.nBA.CO, E.AE.AA, P.MAH, ionomers and the like, whereby E.AA is preferred. PE or the above mentioned copolymers and terpolymers may be employed alone or as bonding layer deposited by co-extrusion or by extrusion lamination, providing adhesion to other strip-shaped materials. Also, using PE or the above mentioned copolymers or terpolymers, two or more films or laminates featuring a metal layer according to the invention may be joined.

The above mentioned monomer components are as follows:

AA acrylic acid
AE acrylic ester (MA, EA, BA)
nBA n-butyl-acrylate
CO carbon monoxide
EA ethyl acrylate
MA methyl acrylate
MAA methylacrylic acid
MAH maleic acid anhydride
VA vinyl acetate The plastic film of the composite plastic film according to the invention is e.g. of a polyester, in particular polyethylene-terephthalate (PET), oriented polyamide (oPA), oriented polypropylene (oPP) or the like.

Of course the composite plastic film according to the invention may feature further layers of plastic or lacquer coatings which may also be printed on.

The object of the invention with respect to the process is achieved in that, before extrusion coating, a metal layer of chromium, aluminum, nickel, titanium, iron, molybdenum or an alloy made up from at least two of these metals is deposited as an aid to bonding on the plastic film or on the ceramic layer which may be present, this using a vacuum thin layer deposition process.

The thin metal layer is preferably deposited by vapor deposition or sputtering, preference being given to sputtering.

The metal layer is preferably deposited in an amount corresponding to a monatomic layer with a layer thickness of approximately 0.1 to 0.5 nm.

A useful version of the process according to the invention is such that the metal layer is deposited in line with another vacuum thin layer process employed to achieve another property, in particular a vacuum thin layer deposition process for depositing a ceramic material on the plastic film. As a very thin metal layer is sufficient to obtain good bonding, it is possible to sputter this layer with a sputter cathode at very high through rates which are compatible with the vaporization process.

As a result of the small thickness of metal layer required, it is possible for the coating source to be arranged between two deflecting rolls, without a coating roll (free-span operating mode). The coating source e.g. two sputter cathodes may also be arranged such that both sides of the plastic film can be provided with a thin metal layer as aid to bonding.

It is also possible within the scope of the invention to conduct the extrusion coating likewise in line in vacuum. To that end, however, the melt to be extruded has to be degassed before extrusion, usefully in the extruder using a commercially available twin screw extruder with vacuum degassing facility.

EXAMPLE No. 1

A 12 μm thick polyester film of polyethyleneterephthalate (PET) is pre-treated in line first by means of an oxygen plasma and subsequently coated with 80 nm $SiO_{1.8}$ by means of electron beam vaporization. After that follows coating with chromium. The strip speed is 200 m/min, the breadth of coating is 690 mm. The coating with chromium takes place on the same coating roll as that on which the coating with $SiO_{1.8}$ takes place, using a DC magnetron sputtering cathode (PK750 from Leybold) on which a chromium plate target is soldered. The precipitation takes place in an argon atmosphere at $3.10^{-3}$ mbar. The electric power for the sputtering cathode is 10 kW. Under these conditions a layer thickness of approximately 1.5 Angstrom (0.15 nm) is obtained.

The polyester film, coated this way in vacuum, is then coated with 10 μm thick E.AA/15 μm LDPE (low density polyethylene) in a separate step in a co-extrusion coating unit. The layer thickness is 25 μm. The layers cannot be separated.

To test the composite film for its suitability for packaging purposes, two such coated films were sealed together at the PE-coated side under the influence of pressure and heat. The strength of the sealing seam measured according to DIN 53539 amounted to 16.3N/15 mm.

EXAMPLE No. 2

A composite film is manufactured as in the first example, the extrusion coating being carried out, however, only with PE without E.AA. The strength of the sealing seam amounted to 11.3N/15 mm.

EXAMPLE No. 3 (for comparison)

A composite film is manufactured as in the first example, however, without coating with chromium. The subsequent co-extrusion coating with PE or E.AA did not produce adequate bonding.

EXAMPLE No. 4

A 15 μm thick film of oriented polyamide (oPA) is coated as in the first example. The subsequent extrusion coating with PE or E.AA also resulted in excellent bonding values of >10N/15 mm.

EXAMPLE No. 5

A 12 μm thick PET film is coated as in the first example. In addition, however, a further sputtering cathode in the vacuum coating unit is used which is employed to coat also the rear side of the film with chromium in "free-span" mode. The result is a film which may be coated on both sides using extrusion coating. The film is co-extrusion coated or extrusion laminated on both sides with a 100 μm thick layer of E.AA/LDPE. This way an aluminum free laminate with excellent barrier properties against gases and loss of aroma substances for toothpaste tubes is obtained.

EXAMPLE No. 6

A further so-called tube laminate features, as in example No. 5, a 12 μm thick PET film coated on both sides with chromium. The subsequent outer side of the tube is of a 110 μm thick PE film which is joined to the PET film via a 50 μm thick layer of E.AA copolymer e.g. by extrusion lamination. The inner side of the tube comprises a 60 μm thick PE film joined to the rear side of the chromium coated PET-film e.g. by coextrusion with a 40 μm layer of a E.AA-copolymer.

A composite plastic film 10 shown in FIG. 1 comprises an e.g. 12 μm thick plastic film 12 of PET, coated with a ceramic layer of $SiO_x$, where x is for example 1.8. On the ceramic layer 14 is a metal layer 16 e.g. a 0.2 nm thick layer of chromium deposited by sputtering. The metal layer 16 serves as an aid to bonding for a plastic layer 18 e.g. PE or E.AA deposited by extrusion coating.

Figure 2:
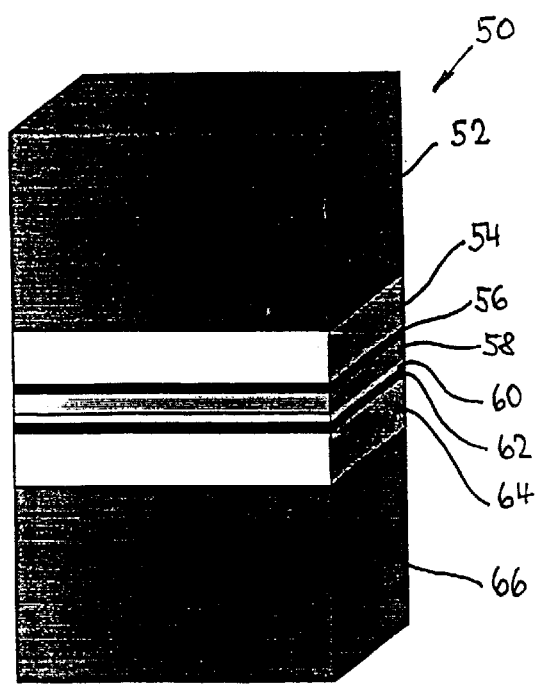
FIG. 2—layered structure of a laminate suitable for manufacture of tubes.

FIG. 2 shows the layered structure of the tube laminate according to example No. 6. A tube laminate 50 exhibits the following layer structure from the outside of the tube to the inside of the tube:

52 PE film, 110 μm
54 extrusion laminate layer of a E.AA copolymer, 50 μm
56 chromium layer
58 PET film, 12 μm
60 coating of $SiO_{1.8}$
62 chromium layer
64 E.AA layer, 40 μm
66 PE layer, 60 μm The E.AA layer 64 is deposited along with the PE layer 66 by co-extrusion onto the chromium layer 62.

The tube laminate 50 shown in FIG. 2 is a base laminate which may feature further layers, in particular on the outer side of the tube i.e. on the PE film 52.

Figure 3:
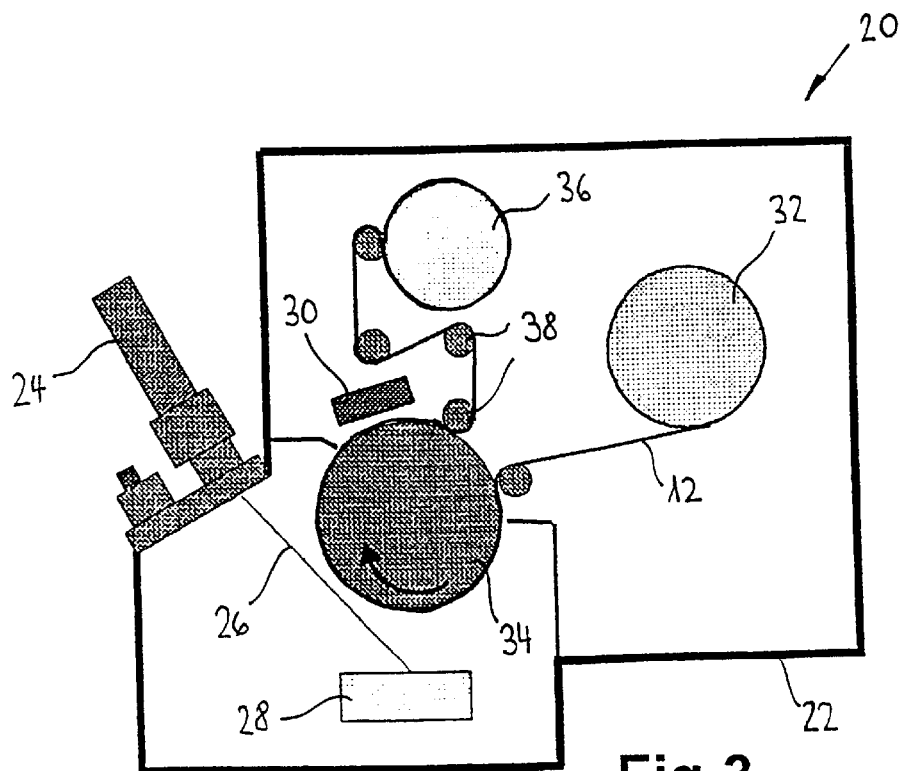
FIG. 3—a device for performing the process according to the invention.

A coating unit 20 shown in FIG. 3 features a vacuum chamber 22. An electron beam 26 emitted from an electron beam gun 24 is directed at material 28 in a crucible or in the form of a plate, as a result of which the material 28 is heated and vaporized by the energy of the impinging electron beam 26 in order to form the ceramic layer 14.

Also within the vacuum chamber, in order to form the thin metal layer, is the metal or alloy in the form of a metal plate soldered to a sputter cathode 30. An argon atmosphere at a pressure of $3.1^{-3}$ mbar is maintained inside the vacuum chamber. The electric power for the sputter cathode is adjusted to provide the thickness of layer according to the invention.

Within the vacuum chamber the plastic film 12 is uncoiled from a first roll 32 and drawn over a roll 34. The plastic film 12, lying on the roll 34 as substrate, forms a substrate area onto which the material 28 which is vaporised by the beam 26 from the electron beam gun 24 is deposited in order to form a ceramic layer 14. The thin metal layer 16 is deposited by sputtering onto the ceramic layer 14 on the plastic film 12. After coating with the ceramic layer 14 and metal layer 16, the coated plastic layer 12 is coiled onto a further roll 36.

Deflecting rolls 38 are provided to guide the plastic film 12. The speed at which the strip of plastic film 12 advances lies e.g. around 400 m/min. The plastic film 12 coated with the ceramic layer 14 and metal layer 16 is for reason of clarity not shown here subsequently fed to an extrusion coating unit for deposition of the extrusion layer 18.

What is claimed is:

1. Composite plastic film comprising a plastic film, a plastic layer deposited by extrusion coating on the plastic film, and a separate metal layer contacting said plastic layer of at least one of chromium, aluminum, nickel, titanium, iron, molybdenum and an alloy made from at least two of these metals provided, as an aid to bonding, between the plastic film and the plastic layer which is deposited by extrusion coating.

2. Composite plastic film according to claim 1, including a ceramic material deposited using a vacuum thin layer deposition process on one side of said plastic film, wherein the plastic layer is deposited by extrusion coating on the ceramic layer such that the ceramic layer is situated between the plastic film and plastic layer, and wherein the metal layer is provided between the ceramic layer and the plastic layer deposited by extrusion coating.

3. Composite plastic film according to claim 2, wherein the plastic film is coated with a ceramic layer of $SiO_x$, where x represents a number between 0.9 and 2.

4. Composite plastic film according to claim 2, wherein the plastic film is coated with a ceramic layer of SiOx, where x represents a number between 1.5 and 1.8.

5. Composite plastic film according to claim 1, wherein the metal layer has a thickness of 0.1 to 0.5 nm corresponding to a monatomic coverage.

6. Composite plastic film according to claim 1, wherein the plastic layer deposited by extrusion coating comprises at least one of the plastics, polyethylene (PE) or copolymers/ terpolymers with ethylene (E) or propylene (P) as one of the monomer components.

7. Composite plastic film according to claim 6, wherein the plastic layer comprises at least one of the following copolymers/terpolymers with ethylene (E) or propylene (P) as one of the monomer components: E.AA, E.MAA, E.VA, E.MA, E.EA. E.nBA, E.CO, E.VA.CO, E.nBA.CO, E.AE.AA or P.MAH where AA stands for acrylic acid, AE for acrylic ester (MA, EA, BA), nBA for n-butyl-acrylate, CO for carbon monoxide, EA for ethyl acrylate, MA for methacrylate, MAA for methyacrylic acid, MAH for maleic acid anhydride and VA for vinyl acetate.

8. Composite plastic film according to claim 1, wherein the plastic film is of a polyester.

9. Composite plastic film according to claim 8, wherein the plastic film is one of polyethylene-terephthalate (PET), oriented polyamide (oPA), and oriented polypropylene (oPP).

10. Process for manufacturing a composite plastic film comprising depositing a plastic layer on a plastic film by extrusion coating on the plastic film, wherein before extrusion coating, a separate metal layer of at least one of chromium, aluminum, nickel, titanium, iron, molybdenum and an alloy made up from at least two of these metals is deposited on the plastic film as an aid to bonding on the plastic film using a vacuum thin layer deposition process, wherein the metal layer contacts the plastic layer.

11. Process according to claim 10, wherein one side of said plastic film is coated with a ceramic layer deposited using a vacuum thin layer deposition process, wherein the plastic layer is deposited by extrusion coating on the ceramic layer such that the ceramic layer is situated between the plastic film and the plastic layer, including the step of providing the metal layer between the ceramic layer and the plastic layer deposited by extrusion coating.

12. Process according to claim 11, wherein the metal layer is deposited in line with a vacuum thin layer process for depositing a ceramic material on the plastic film.

13. Process according to claim 10, wherein the metal layer is deposited by one of vapor deposition and by sputtering.

14. Process according to claim 10, wherein the metal layer is deposited in such an amount that it has a thickness of approximately 0.1 to 0.5 nm corresponding to a monatomic coverage.

15. Process according to claim 10, wherein the metal layer is deposited in line with another vacuum thin layer process to achieve another property by first coating the plastic film with the ceramic layer followed by coating with the metal layer.

16. Process according to claim 10, wherein the extrusion coating is performed in vacuum with the metal layer deposited using a vacuum thin layer deposition process.

* * * * *